(12) United States Patent
De Fazio

(10) Patent No.: US 7,968,642 B2
(45) Date of Patent: Jun. 28, 2011

(54) REDISPERSIBLE POLYMERS INCLUDING A PROTECTIVE COLLOID SYSTEM

(75) Inventor: Valentino De Fazio, Pascoe Vale South (AU)

(73) Assignee: Acquos Pty Ltd, Campbellfield, Victoria (AU)

( * ) Notice: Subject to any disclaimer, the term of this patent is extended or adjusted under 35 U.S.C. 154(b) by 23 days.

(21) Appl. No.: 12/527,965

(22) PCT Filed: Feb. 22, 2008

(86) PCT No.: PCT/AU2008/000237
§ 371 (c)(1),
(2), (4) Date: Sep. 3, 2009

(87) PCT Pub. No.: WO2008/101297
PCT Pub. Date: Aug. 28, 2008

(65) Prior Publication Data
US 2010/0087583 A1 Apr. 8, 2010

(30) Foreign Application Priority Data

Feb. 22, 2007 (AU) ................ 2007900910

(51) Int. Cl.
*C08K 5/00* (2006.01)
*C08L 29/04* (2006.01)
(52) U.S. Cl. ................ 524/515; 524/503
(58) Field of Classification Search ........ 524/515
See application file for complete search history.

(56) References Cited

U.S. PATENT DOCUMENTS

| 3,883,489 A | 5/1975 | Matschke et al. |
| 5,118,751 A | 6/1992 | Schulze et al. |
| 5,225,478 A * | 7/1993 | Beckerle et al. ............ 524/510 |
| 5,430,092 A | 7/1995 | Aydin et al. |
| 5,519,084 A | 5/1996 | Pak-Harvey et al. |
| 5,567,750 A | 10/1996 | Schulze et al. |
| 5,874,524 A | 2/1999 | Pakusch et al. |
| 6,028,167 A | 2/2000 | Pakusch et al. |
| 6,706,805 B2 | 3/2004 | Weitzel |
| 2006/0020058 A1 | 1/2006 | Grawe et al. |

FOREIGN PATENT DOCUMENTS

| AU | 717206 | 3/2000 |
| AU | 718907 | 4/2000 |
| DE | 2445813 | 4/1976 |
| DE | 196 29 526 A1 | 1/1998 |
| EP | 1158007 | 11/2001 |
| JP | 10-060402 | 3/1998 |
| WO | WO2005/021145 | 3/2005 |
| WO | WO2006/034531 | 4/2006 |

OTHER PUBLICATIONS

Supplementary European Search Report and Opinion on European Patent Application No. EP 08 70 6120 (Apr. 12, 2010).
International Search Report mailed Apr. 14, 2008, (2 pgs).

* cited by examiner

*Primary Examiner* — Ling-Siu Choi
*Assistant Examiner* — Hui Chin
(74) *Attorney, Agent, or Firm* — Kagan Binder, PLLC

(57) ABSTRACT

A redispersible polymer including, as a redispersing aid, a protective colloid system including from 30% to 100% of a low molecular weight polyacrylamide colloid having a 20% solution viscosity in water of 200 to 800 Centipoise.

21 Claims, No Drawings

REDISPERSIBLE POLYMERS INCLUDING A PROTECTIVE COLLOID SYSTEM

FIELD OF THE INVENTION

The present invention relates to redispersible polymers and in particular redispersible polymer powders including, as a redispersing aid, a protective colloid system that aids in the redispersability of the polymer. More particularly, the invention relates to a redispersible polymer that includes a protective colloid system containing a low molecular weight polyacrylamide colloid. The invention also relates to various methods for the production of such redispersible polymers and in particular redispersible polymer powders.

BACKGROUND TO THE INVENTION

The use of redispersible film forming polymers in powder form finds widespread use throughout a number of industries. For example, such redispersible film forming polymers are used as construction binders for tile adhesives, synthetic resin plasters, floor levelling mixes, EIFS (exterior insulating finishing systems) and in areas where a waterless system is generally desirable. These systems in general are produced by the dry blending of the raw materials, such as sand, cement, calcium carbonate, silica flour, modified cellulose based thickeners, and the dry polymer powder, to obtain a ready to use finished product for site mixing where water is added at the point of use. Such systems are advantageous as they avoid the need for two separate prepackaged components, one component containing an aqueous polymer dispersion and the other component containing the powder component which may contain a hydraulic setting component such as cement (i.e. so-called "two component systems). Avoiding such systems may be advantageous for a number of reasons such as economy, utility and environmental considerations.

To obtain a film forming polymer in powder form, a liquid dispersion of the polymer is subjected to a drying operation where the water is removed. The method may include, for example, spray drying or freeze drying. Spray drying is a widely used and understood method that gives a fine powder which usually does not require further processing. This method is therefore generally preferred in the industry.

In order to manufacture a redispersible film forming polymer powder with glass transitions below 50° C., it is generally necessary to add to the liquid dispersion before spray drying or during polymerisation of the dispersion polymer a quantity of redispersing aid. Redispersing aids act to coat the individual polymer particles to prevent irreversible primary particle formation during drying operations of the polymer dispersion. Such aids also advantageously increase the yield during the spray drying process by minimizing sticking of the dried polymer to the walls of the spray dryer. The redispersing aid may also improve the storage stability of the polymer powder by minimizing "blocking" (the thermoplastic fusion of the polymer particles under weight pressure), and should generally have some hydrophilic properties to aid redispersability of the polymer powder on the reintroduction of water.

The redispersible polymer powders known to date generally comprise a redispersing aid that is water soluble and which is generally added to the polymer dispersion before spray drying. As stated above, this advantageously prevents or reduces the formation of primary particles during the spray drying operation. Alternatively, the redispersing aid may be added during polymerisation of the liquid polymer dispersion to aid in colloidally stabilising the polymer during polymerisation and as a redispersing aid during spray drying.

The use of salts of arylsulfonic acid—formaldehyde condensates as redispersing aids is known, especially for acrylic dispersions. German Offenlegungsschrift 24 45 813 translated as "Redispersible synthetic powder and method of production" describes the use of phenol sulfonic acid formaldehyde condensates and naphthalene sulfonic acid formaldehyde condensates and their alkali salts or their alkali earth metal salts as redispersing aids for redispersible powders. U.S. Pat. No. 5,225,478 assigned to BASF also describes the use of phenol sulfonic acid formaldehyde condensates and their alkali salts or alkali earth metal salts as a redispersing aid. U.S. Pat. No. 6,028,167 assigned to BASF describes an improvement by controlling the molecular weight of the redispersing aids. Likewise, Australian Patent No. 718,907 describes an improvement in naphthalene sulfonic acid formaldehyde condensates by controlling or restricting the molecular weight of the redispersing aids.

Australian application number 2003904725 to Acquos Pty Ltd describes an ortho-cresol sulfonate condensate based oligomer where a low molecular weight product is obtained with high molecular weight condensates practically eliminated. This provides for considerable improvements in the properties of the manufactured redispersible powders. WIPO application number WO2006/034531 provides for further improvements.

Whilst the abovementioned low molecular weight product aryl sulfonic acid formaldehyde condensates, such as the phenol sulfonic acid formaldehyde condensate as in U.S. Pat. No. 6,028,167 and the naphthalene sulfonic acid formaldehyde condensate in Australian Patent No. 718,907, are effective redispersing aids, with Australian application number 2003904725 being an especially effective redispersing aid, they suffer from some minor drawbacks such as colour and set time retardation at large polymer dosage levels.

Polyvinyl alcohols have historically been used as redispersing aids for ethylene vinyl acetate (EVA) dispersions for many years. For example, U.S. Pat. No. 3,883,489 assigned to Hoechst Aktinengellschaft makes use of polyvinyl alcohol as a redispersing aid for ethylene vinyl acetate dispersions. Whilst not as effective, polyvinyl alcohols can also be used as redispersing aids in the manufacture of redispersible acrylic or styrene-acrylic polymer powders. For example, U.S. Pat. No. 5,567,750 assigned to Wacker-Chemie GmbH makes use of a polyvinyl alcohol along with an amino functional polyvinyl alcohol for the manufacture of a redispersible styrene-acrylic polymer powder. U.S. Pat. No. 5,519,084 assigned to Air Products and Chemicals makes use of a polyvinyl alcohol as a redispersing aid with an acrylic polymer consisting of up to 15% olefinically unsaturated carboxylic acid.

The use of polyvinylalcohol as a protective colloid in the preparation of vinyl acetate-acrylate (or vinyl acrylic) ester copolymer (optionally with ethylene) is mentioned in U.S. Pat. No. 6,706,805. Although these polymers are effectively redispersible, the polymer is formed in two stages. The first stage involves polymerisation of the vinyl ester component to a conversion of from 90-100% by weight and the second stage the addition of an ester of (meth)acrylic acid and subsequent polymerisation. Whilst it would be desirable to have an even distribution of alkyl (meth)acrylate along the vinyl acetate based backbone to render the polymer more alkali resistant and hydrophobic, none of the current technologies based exclusively upon polyvinyl alcohol aids are entirely satisfactory for redispersible polymer powders.

The redispersible polymer powders commercially offered to date may hence be classified into systems that are:
1) Polyvinyl alcohol based;
2) Alkyl aryl sulfonate based;

3) Proprietary colloid based; or
4) Core shell technology based.

The most popular commercial redispersible polymer powders are based on either polyvinyl alcohol or alkyl aryl sulfonate technology. To date, no mention or successful attempt has been made involving the use of a polyacrylamide protective colloid as the main protective colloid, or one of the main protective colloids, during formation of a redispersible polymer powder, for example based on vinyl acrylic technology.

SUMMARY OF THE INVENTION

According to one aspect of the invention there is provided a redispersible polymer including, as a redispersing aid, a protective colloid system including from 30% to 100% of a low molecular weight polyacrylamide colloid having a 20% solution viscosity in water of 200 to 800 Centipoise.

In one embodiment, the redispersible polymer is a redispersible polymer powder or liquid. Preferably, the redispersible polymer is a redispersible polymer powder.

The redispersible polymer may include the protective colloid system from 30 wt % to 95 wt % of a low molecular weight polyacrylamide colloid having 20% solution viscosity in water of 200 to 800 Centipoise. The protective colloid may also be present in the redispersible polymer powder in an amount of from 30 wt % to 90 wt %, 30 wt % to 85 wt %, 30 wt % to 80 wt %, 30 wt % to 75 wt %, 30 wt % to 70 wt %, 30 wt % to 65 wt %, 30 wt % to 60 wt %, 30 wt % to 55 wt %, 30 wt % to 50 wt %, 35 wt % to 50 wt %, or from 40 wt % to 45 wt % of a low molecular weight polyacrylamide colloid having 20% solution viscosity in water of 200 to 800 Centipoise.

The protective colloid system may also include for example up to 70 wt % polyvinyl alcohol. The protective colloid system may include from 5 to 70 wt % polyvinyl alcohol, 10 to 70 wt % polyvinyl alcohol, 15 to 70 wt % polyvinyl alcohol, 20 to 70 wt % polyvinyl alcohol, 25 to 70 wt % polyvinyl alcohol, 30 to 70 wt % polyvinyl alcohol, 35 to 70 wt % polyvinyl alcohol, 40 to 70 wt % polyvinyl alcohol, 45 to 70 wt % polyvinyl alcohol, 50 to 70 wt % polyvinyl alcohol, 55 to 60 wt % polyvinyl alcohol, or 60 to 70 wt % polyvinyl alcohol. The polyvinyl alcohol may be partially hydrolysed or fully hydrolysed. The protective colloid system may include the polyvinyl alcohol along with the abovementioned low molecular weight polyacrylamide with a 20% solution viscosity of 200 to 800 Centipoise.

Such low molecular weight polyacrylamides, are excellent colloidal stabilisers and redispersing aids when used during emulsion polymerisation of, for example, vinyl (meth)acrylic based polymers that optionally contain ethylene. The colloid further contributes to the final strength of the polymer powder in as much the same way as the polyvinyl alcohol colloids do for ethylene vinyl acetate polymer powders. These polyacrylamide colloids further have cost advantages over polymers based on polyvinyl alcohol.

While the process for the formation of the low molecular weight polyacrylamide colloid is not particularly limited, in a preferred embodiment the low molecular weight polyacrylamide colloid is manufactured using from 1% to 10 wt % persulfate initiator based on acrylamide content during polymerisation. The persulfate initiator may also be in the range of from 1 wt % to 10 wt %, 1 wt % to 9 wt %, 1 wt % to 8 wt %, 1 wt % to 7 wt %, 1 wt % to 6 wt %, 1 wt % to 5 wt %, 2 wt % to 5 wt %, 3 wt % to 5 wt %, or from 3.5 wt % to 4.5 wt %. In one example, the persulfate initiator is present together with the polyacrylamide colloid in an amount of about 4 wt %. It has been found that such colloids are particularly suitable for use as redispersing aids.

While not wanting to be bound by any theory as to why these colloids are particularly effective, it is assumed that the combination of a particular molecular weight and a high level of residual persulfate on the polyacrylamide chain results in a very water soluble colloid that is a very effective polymerisation stabilisation aid as well as an effective redispersing aid.

The persulfate initiator is not particularly limited and may be selected from the group consisting of ammonium persulfate, potassium persulfate, sodium persulfate and mixtures thereof.

As previously noted, the redispersible polymer may be based on a polymer formed by the emulsion polymerisation of a vinyl (meth)acrylic based polymer. In that case, the vinyl (meth)acrylic based polymer may contain ethylene. Other options for the polymer are described below.

The colloid can also be manufactured using a small amount of reducing agent during polymerisation to aid in low molecular weight formation. Selected chain transfer agents may also be employed. Examples of reducing agents include ascorbic acid and sodium metabisulfite, whilst an example of a chain transfer agent is isopropanol, n-dodecyl mercaptan. The reaction is preferably performed in water as a solution polymerisation using persulfate initiator at temperatures up to 100 degrees C. A clear solution is usually obtained with a viscosity of 200 to 800 centipoise for a 20% solution using a Brookfield Viscometer Spindle 2 at 30 rpm. A higher viscosity will usually indicate too high a molecular weight for these type of polyacrylamide colloids. It has been found that the subject molecular weight is very effective. However, slightly higher molecular weights may also be used with limited success or commercial utility.

According to another aspect of the invention there is provided a method of manufacturing a redispersible polymer including polymerising a redispersible polymer in the presence of a protective colloid system including from 30% to 100% of a low molecular weight polyacrylamide colloid having a 20% solution viscosity in water of 200 to 800 Centipoise.

In one embodiment, the redispersible polymer is a redispersible polymer powder or liquid. Preferably, the redispersible polymer is a redispersible polymer powder.

The step of polymerising a redispersible polymer and in one particular embodiment a redispersible polymer powder in the presence of a protective colloid system may include the presence of the protective colloid system from 30 wt % to 95 wt % of a low molecular weight polyacrylamide colloid having 20% solution viscosity in water of 200 to 800 Centipoise. The protective colloid system may also be present in the redispersible polymer powder in an amount of from 30 wt % to 90 wt %, 30 wt % to 85 wt %, 30 wt % to 80 wt %, 30 wt % to 75 wt %, 30 wt % to 70 wt %, 30 wt % to 65 wt %, 30 wt % to 60 wt %, 30 wt % to 55 wt %, 30 wt % to 50 wt %, 35 wt % to 50 wt %, or from 40 wt % to 45 wt % of a low molecular weight polyacrylamide colloid having a 20% solution viscosity in water of 200 to 800 Centipoise.

The redispersible polymers are manufactured using the abovementioned polyacrylamide colloids as a protective colloid during polymerisation. This component may, for example, replace up to 100% of the conventionally used polyvinyl alcohol protective colloid. That is, a mixed colloid composition may be employed.

The polyacrylamide colloid, optionally together with a conventional polyvinyl alcohol protective colloid, may be added to the reactor charge of the reactor or may be split between the reactor and the monomer feed or added as a separate feed.

Surfactants may also be added during or after polymerisation. If surfactants are added, a minimum amount is preferably added to aid water resistance and redispersability. Low HLB surfactants (HLB around 4-9) may be used alone or added with high HLB anionic surfactants. High HLB anionic surfactants may also be used alone or added with low HLB surfactants. The redispersible polymer powders once dried may also have a post addition of surfactant high in HLB (>12) on a suitable carrier to aid in irreversible film formation once redispersed. The reaction is generally conducted using initiators such as persulfate initiators, hydrogen peroxide or tertiary butyl hydro peroxide (TBHP) in water.

A wide range of monomers may be used in the polymerisation process including, but not limited to, at least one monomer selected from (meth)acrylate monomers, such as methyl (meth)acrylate, ethyl (meth)acrylate, butyl (meth)acrylate and 2-ethyl-hexyl (meth)acrylate, vinyl monomers, such as vinyl acetate and vinyl propionate, vinyl versatic acids, such as VEOVA monomer, styrene, butadiene and other gaseous monomers, such as ethylene.

Polymerisation is conducted in the presence of the protective colloid as discussed above, generally with a minimum amount of surfactant. In effect, the dispersion polymer is stabilised with the polyacrylamide protective colloid exclusively, or preferably with polyvinyl alcohol as a combination colloid system. Any excess surfactant may be detrimental to the properties of the resultant redispersible polymer. The polymerisation may be performed using conventional seeded technology, core shell technology or by staged feed addition as discussed in U.S. Pat. No. 6,706,805.

The ready polymer dispersions may optionally be diluted with water and a further addition of protective colloid added before spray drying. Spray drying is carried out using methods known in the field preferably with the addition of a mineral anticaking agent during spray drying.

EXAMPLES

Embodiments of the invention will now be discussed in more detail with reference to the following examples which are provided for exemplification only and which should not be considered limiting on the scope of the invention in any way.

Polyacrylamide Solution A.

A 20% polyacrylamide manufactured with 4% Sodium Persulfate based on acrylamide, was polymerised to completion with 0.1% reducing agent. The resulting clear solution having a solution viscosity in water of 410 cps using a Brookefield Viscometer Spindle 2 at 30 rpm using.

Example 1

A 6 litre glass reactor was loaded with 800 g water, 10 g on nonyl phenol ethoxylate having 4 EO per mol of nonyl phenol, 2 g of sulfated nonyl phenol ethoxylate with 30 mols EO per mol of nonyl phenol, 5 g of defoamer and 1500 g of Polyacrylamide solution A is heated to 65 degrees C. To this was dosed a solution of 4.5% TBHP in water over a period of 4.5 hours, a solution of water and ascorbic acid over 4 hours, a solution of water and iron ammonium sulfate solution over 4 hours, and a solution of 50 g of acrylamide, 1400 g of Vinyl Acetate and 350 g of 2-Ethyl Hexyl Acrylate over 4 hours. The dispersion was then further reacted for another hour.

Example 2

A 6 litre glass reactor was loaded with 800 g of water, 10 g on nonyl phenol ethoxylate having 4 EO per mol of nonyl phenol, 2 g of sulfated nonyl phenol ethoxylate with 30 mols EO per mol of nonyl phenol, 5 g of defoamer and 1500 g of Polyacrylamide solution A is heated to 65 degrees C. To this was dosed a solution of 4.5% TBHP in water over a period of 4.5 hours, a solution of water and ascorbic acid over 4 hours, a solution of water and iron ammonium sulfate solution over 4 hours, and a solution of 50 g of acrylamide, 700 g of Vinyl Acetate and 560 g of Butyl Acrylate and 490 g of Methyl Methacrylate over 4 hours. The dispersion was then further reacted for another hour.

Example 3

A 6 litre glass reactor was loaded with 800 g water, 10 g on nonyl phenol ethoxylate having 4 EU per mol of nonyl phenol, 2 g of sulfated nonyl phenol ethoxylate with 30 mols EO per mol of nonyl phenol, 5 g of defoamer, 750 g of 20% Polyvinyl alcohol solution (Gonsenol GL05) and 750 g of Polyacrylamide solution A is heated to 65 degrees C. To this was dosed a solution of 4.5% TBHP in water over a period of 4.5 hours, a solution of water and ascorbic acid over 4 hours, a solution of water and iron ammonium sulfate solution over 4 hours, and a solution of 50 g of acrylamide, 1400 g of Vinyl Acetate and 350 g of 2-Ethyl Hexyl Acrylate over 4 hours. The dispersion was then further reacted for another hour.

The resulting samples above were then spray dried without further processing to give white free flowing redispersible polymer powders with 10% anticaking agent added during the spray drying process. The resultant powders were very readily redispersed.

It will of course be realised that the above has been given only by way of illustrative example of the invention and that all such modifications and variations thereto as would be apparent to those of skill in the art are deemed to fall within the broad scope and ambit of the invention as herein set forth.

The invention claimed is:

1. A redispersible polymer including, as a redispersing aid, a protective colloid system including from 30 wt % to 100 wt % of a low molecular weight polyacrylamide colloid having a 20% solution viscosity in water of 200 to 800 Centipoise.

2. A redispersible polymer according to claim 1, wherein the low molecular weight polyacrylamide colloid is manufactured using from 1 wt % to 10 wt % persulfate initiator based on acrylamide content during polymerisation.

3. A redispersible polymer according to claim 1, including a polymer formed by the emulsion polymerisation of a vinyl (meth)acrylic based polymer.

4. A redispersible polymer according to claim 3, wherein the vinyl (meth)acrylic based polymer contains ethylene.

5. A redispersible polymer according to claim 2, wherein the persulfate initiator is selected from ammonium persulfate, potassium persulfate and sodium persulfate.

6. A redispersible polymer according to claim 1, wherein the polyacrylamide colloid is manufactured using an amount of reducing agent and/or chain transfer agent during polymerisation to aid in the formation of low molecular weight species.

7. A redispersible polymer according to claim 6, wherein the reducing agent is selected from ascorbic acid and sodium metabisulfite and/or the chain transfer agent is isopropanol, n-dodecyl mercaptan.

8. A redispersible polymer according to claim 1, wherein the protective colloid system includes up to 70 wt % polyvinyl alcohol.

9. A redispersible polymer according to claim 1, which is in the form of a powder or a liquid.

10. A method for manufacturing a redispersible polymer including polymerising a redispersible polymer in the presence of a protective colloid system including from 30 wt % to 100 wt % of a low molecular weight polyacrylamide colloid having a 20% solution viscosity in water of 200 to 800 Centipoise.

11. A method according to claim 10, wherein the protective colloid system including the polyacrylamide colloid is added to a reactor charge in a reactor or is split between the reactor charge in the reactor and a monomer feed or is added as a separate feed.

12. A method according to claim 10, wherein at least one surfactant is added during and/or after polymerisation.

13. A method according to claim 12, wherein the surfactant is selected from low HLB surfactants (HLB around 4-9), high HLB anionic surfactants and mixtures thereof.

14. A method according to claim 10, wherein a surfactant high in HLB (>12) on a suitable carrier is added to the redispersible polymer post-drying to aid in irreversible film formation once redispersed.

15. A method according to claim 10, wherein an initiator is selected from the group consisting of persulfate initiators, hydrogen peroxide and tertiary butyl hydro peroxide (TBHP) in water which is used during polymerisation of the redispersible polymer.

16. A method according to claim 15, wherein the initiator is used in an amount from 1 wt % to 10 wt % based on acrylamide content during polymerisation.

17. A method according to claim 10, wherein the redispersible polymer is formed from at least one monomer selected from (meth)acrylate monomers, vinyl monomers, vinyl versatic acids, styrene, butadiene and other gaseous monomers.

18. A method according to claim 10, wherein polymerisation of the redispersible polymer is conducted in the presence of a minimal amount of surfactant.

19. A method according to claim 10, wherein the protective colloid system includes up to 70 wt % polyvinyl alcohol.

20. A redispersible polymer produced by the method according to claim 10.

21. A method according to claim 10, wherein the redispersible polymer is formed from at least one monomer selected from methyl (meth)acrylate, ethyl (meth)acrylate, butyl (meth)acrylate, 2-ethyl-hexyl (meth)acrylate, vinyl acetate, vinyl propionate, vinyl ester of versatic acid monomer, styrene, butadiene and ethylene.

\* \* \* \* \*